(12) United States Patent
Kano

(10) Patent No.: US 12,513,380 B2
(45) Date of Patent: Dec. 30, 2025

(54) OPTICAL SYSTEM AND INSPECTION APPARATUS

(71) Applicant: CANON KABUSHIKI KAISHA, Tokyo (JP)

(72) Inventor: Hiroto Kano, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 18/320,858

(22) Filed: May 19, 2023

(65) Prior Publication Data

US 2023/0388612 A1  Nov. 30, 2023

(30) Foreign Application Priority Data

May 25, 2022 (JP) ................................. 2022-085101

(51) Int. Cl.
| | |
|---|---|
| H04N 23/54 | (2023.01) |
| G02B 5/00 | (2006.01) |
| G02B 27/00 | (2006.01) |
| G02B 27/28 | (2006.01) |
| G06T 7/00 | (2017.01) |
| H04N 23/56 | (2023.01) |
| G02B 13/22 | (2006.01) |

(52) U.S. Cl.
CPC ............. *H04N 23/54* (2023.01); *G02B 5/005* (2013.01); *G02B 27/0093* (2013.01); *G02B 27/286* (2013.01); *G06T 7/0012* (2013.01); *H04N 23/56* (2023.01); *G02B 13/22* (2013.01); *G06T 2207/10152* (2013.01); *G06T 2207/30041* (2013.01)

(58) Field of Classification Search
CPC ........ H04N 23/54; H04N 23/56; G02B 5/005; G02B 27/0093; G02B 27/286; G02B 13/22; G06T 7/0012; G06T 2207/10152; G06T 2207/30041
USPC .......................................................... 348/78
See application file for complete search history.

(56) References Cited

U.S. PATENT DOCUMENTS

| | | | |
|---|---|---|---|
| 2004/0012698 A1* | 1/2004 | Suda ....................... | H04N 23/55 257/E25.032 |
| 2012/0113300 A1* | 5/2012 | Hamano .................. | G06F 18/22 348/241 |
| 2015/0234148 A1* | 8/2015 | Kusaka .................... | G02B 7/34 348/349 |
| 2018/0110411 A1* | 4/2018 | Winsor .................... | A61B 3/12 |
| 2018/0174296 A1* | 6/2018 | Okamoto ............... | A61B 3/102 |
| 2019/0137394 A1* | 5/2019 | Kaneko .................... | A61B 1/00 |

(Continued)

FOREIGN PATENT DOCUMENTS

JP          2018509203 A       4/2018

*Primary Examiner* — Loi H Tran
(74) *Attorney, Agent, or Firm* — Canon U.S.A., Inc. IP Division

(57) ABSTRACT

An inspection apparatus configured to detect first light from a first eye of a subject and second light from a second eye of the subject includes an optical system, and an image sensor, wherein the image sensor includes a pixel including a microlens, a first conversion portion, and a second conversion portion, wherein the optical system focuses the first light on the microlens via a first pupil and focuses the second light on the microlens via a second pupil, and wherein the microlens causes the first light to enter the first conversion portion and causes the second light to enter the second conversion portion.

15 Claims, 14 Drawing Sheets

(56) References Cited

U.S. PATENT DOCUMENTS

2021/0267450 A1* 9/2021 Sharma ................ A61B 3/0008
2022/0239850 A1* 7/2022 Okada .................... H04N 23/11

* cited by examiner

FIG.2
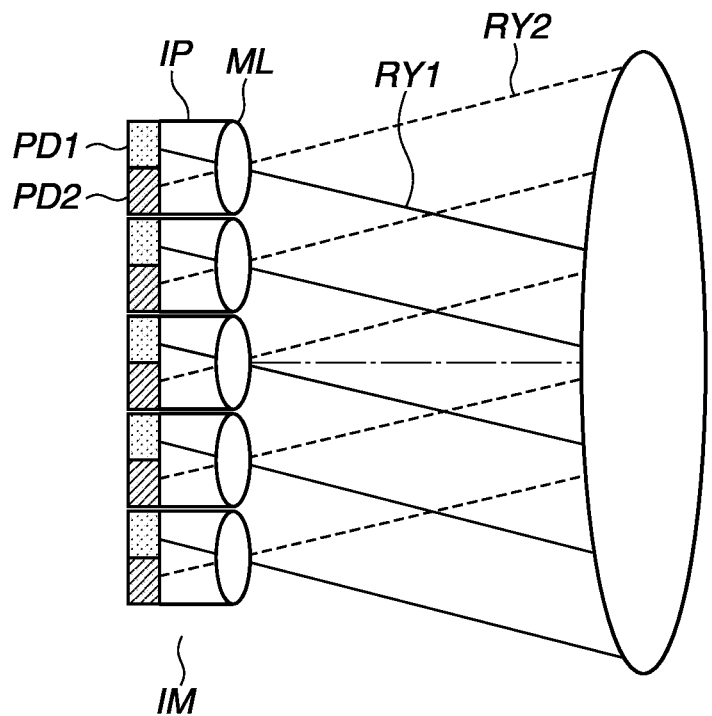
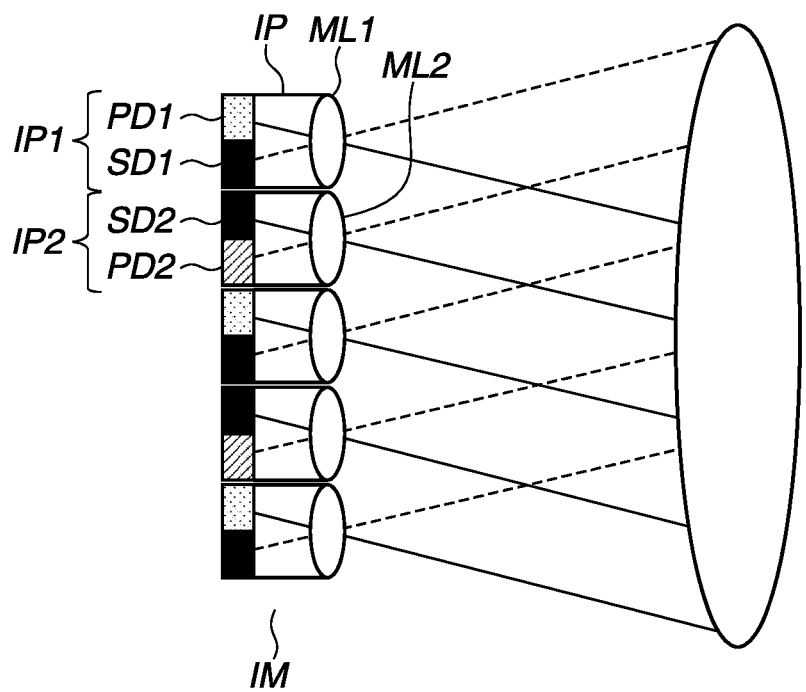

LS31

OPTICAL SYSTEM AND INSPECTION APPARATUS

BACKGROUND

Technical Field

The aspect of the embodiments relates to an optical system and an inspection apparatus configured to measure a fixation state of eyes.

Description of the Related Art

In the center of a macular region of a retina of a human eye is fovea centralis, and the sharpest vision is realized in the area of fovea centralis. Thus, it is known that a point of fixation of a subject (fixation state) is measurable by detecting reflection light from the area of fovea centralis.

Japanese Unexamined Patent Application Publication (Translation of PCT Application) No. 2018-509203 discusses an inspection apparatus that measures a fixation state of a subject by projecting projection light to retinas of right and left eyes of the subject, separating reflection light from the retinas of the right and left eyes of the subject using an optical system, and detecting the separated reflection light from the right eye using an image sensor and the separated reflection light from the left eye using another image sensor.

The inspection apparatus discussed in Japanese Unexamined Patent Application Publication (Translation of PCT Application) No. 2018-509203 includes two image sensors in order to detect reflection light from a retina of a right eye and reflection light from a retina of a left eye separately. With this structure, an optical system guides the reflection light from the right eye to the image sensor corresponding to the right eye and guides the reflection light form the left eye to the image sensor corresponding to the left eye. This makes it difficult to simplify the optical system.

SUMMARY

According to an aspect of the embodiments, an inspection apparatus configured to detect first light from a first eye of a subject and second light from a second eye of the subject comprises: an optical system; and an image sensor, wherein the image sensor includes a pixel including a microlens, a first conversion portion, and a second conversion portion, wherein the optical system focuses the first light on the microlens via a first pupil and focuses the second light on the microlens via a second pupil, and wherein the microlens causes the first light to enter the first conversion portion and causes the second light to enter the second conversion portion.

Further features of the disclosure will become apparent from the following description of exemplary embodiments with reference to the attached drawings.

BRIEF DESCRIPTION OF THE DRAWINGS

FIG. 2 is a diagram illustrating an example of an image sensor.

DESCRIPTION OF THE EMBODIMENTS

Figure 1:
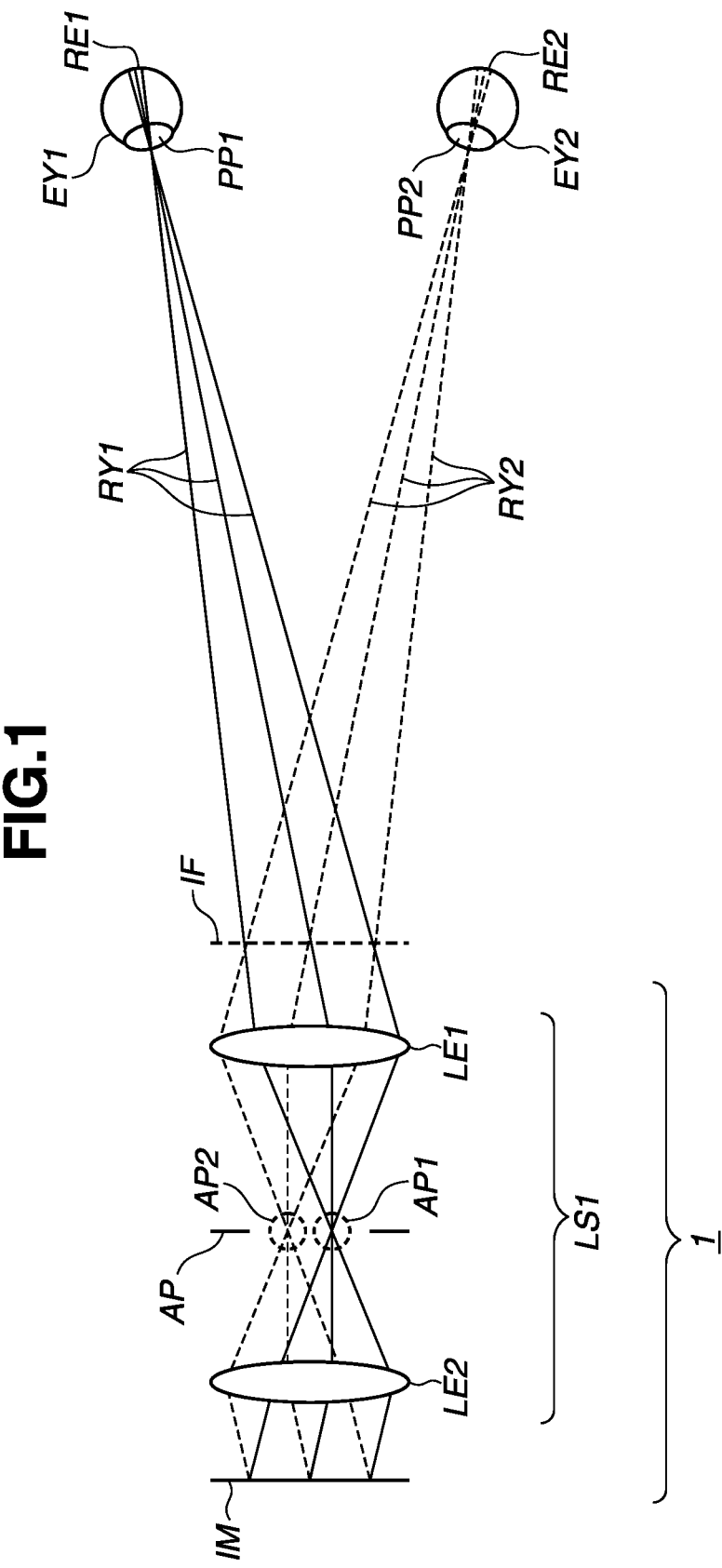
FIG. 1 is a schematic diagram illustrating a main portion of an inspection apparatus according to a first exemplary embodiment.

Various exemplary embodiments of the disclosure will be describe below with reference to the drawings. Some of the drawings are drawn in a different scale from an actual scale for convenience. Further, corresponding components in the drawings are given the same reference numerals to omit redundant descriptions thereof.

FIG. 1 is a schematic diagram illustrating a main portion of an inspection apparatus 1 according to a first exemplary embodiment. The inspection apparatus 1 is an apparatus that measures a fixation state of a first eye EY1 and a second eye EY2 of a subject (person being inspected). The first eye EY1 and the second eye EY2 are different from each other. According to the present exemplary embodiment, the first eye EY1 and the second eye EY2 are a right eye and a left eye, respectively.

The inspection apparatus 1 includes an optical system LS1 and an image sensor IM. In FIG. 1, an imaging plane of the image sensor IM is illustrated, and details of the image sensor IM are illustrated in FIG. 2. The optical system LS1 includes optical elements LE1 and LE2 and an aperture stop AP. Hereinafter, a subject side with respect to the optical system LS1 will be referred to as "object side", and an image sensor side with respect to the optical system LS1 will be referred to as "image side". The image sensor IM is a photoelectric conversion element such as a charge coupled device (CCD) sensor or a complementary metal oxide semiconductor (CMOS) sensor. A light-receiving surface (imaging plane) of the image sensor IM is situated on an image plane of the optical system LS1.

In FIG. 1, first reflection light RY1 (solid line) reflected by a first retina RE1 corresponding to the first eye EY1 and second reflection light RY2 (dotted line) reflected by a second retina RE2 corresponding to the second eye EY2 are illustrated. In one embodiment, only a light ray (chief ray) that travels through a pupil center and each marginal light ray are illustrated, and other light rays are omitted. An intermediate image IF is a retinal image formed by an optical system consisting of the optical system LS1 of the inspection apparatus 1 and the first eye EY1 and the second eye EY2 of the subject. At this time, the first retina RE1 and the second retina RE2 are conjugate with respect to the intermediate image IF. Further, the intermediate image IF is conjugate to the image sensor IM.

The first reflection light RY1 is focused by a first crystalline lens PP1 of the first eye EY1 to form the intermediate image IF, travels through a first pupil AP1 in a first hole portion HO1 of the aperture stop AP, and forms an image on the imaging plane of the image sensor IM. Similarly, the second reflection light RY2 is focused by a second crystalline lens PP2 of the second eye EY2 to form the intermediate image IF, travels through a second pupil AP2 in a second hole portion HO2 of the aperture stop AP, and forms an image on the imaging plane of the image sensor IM. According to the present exemplary embodiment, rays of the first reflection light RY1 and the second reflection light RY2 do not overlap each other while traveling through the first pupil AP1 and the second pupil AP2, and the first pupil AP1 and the second pupil AP2 are in respective regions different from each other. Part of the rays of the first reflection light RY1 and the second reflection light RY2 can overlap with each other, and part of regions of the first pupil AP1 and the second pupil AP2 can overlap with each other. At this time, the number of holes of the aperture stop AP can be one. Further, the inspection apparatus 1 according to the present exemplary embodiment can simultaneously guide the first reflection light RY1 and the second reflection light RY2 to respective photoelectric conversion portions.

An upper diagram in FIG. 2 illustrates the image sensor IM according to the present exemplary embodiment. In one embodiment, only the rays of the first reflection light RY1 and the second reflection light RY2 that travel through a center of each microlens ML are illustrated, and the other light rays are not illustrated.

The image sensor IM includes a single pixel IP or a plurality of pixels IP. The pixel IP or each of the plurality of pixels IP includes the microlens ML, a first photoelectric conversion portion PD1, and a second photoelectric conversion portion PD2. Desirably, an on-chip microlens is used as the microlens ML.

The optical system LS1 focuses the first reflection light RY1 and the second reflection light RY2 on the same (common) microlens ML. At this time, since the first reflection light RY1 and the second reflection light RY2 have traveled through respective pupils different from each other, the first reflection light RY1 and the second reflection light RY2 enter the microlens ML at respective different incident angles. Specifically, one of the normal lines (single-pointed line) of the image sensor IM enters the microlens ML from the upper side, and the other enters the microlens ML from the lower side. The normal line can be a cross section including an optical axis of the microlens ML. Specifically, according to the present exemplary embodiment, the incident angles of the first reflection light RY1 and the second reflection light RY2 on the microlens ML are different from each other in the sign of the incident angle. The microlens ML focuses the first reflection light RY1 from the first pupil AP1 on the first photoelectric conversion portion PD1 (the microlens ML causes the first reflection light RY1 from the first pupil AP1 to enter the first photoelectric conversion portion PD1). Similarly, the microlens ML focuses the second reflection light RY2 from the second pupil AP2 on the second photoelectric conversion portion PD2 (the microlens ML causes the second reflection light RY2 from the second pupil AP2 to enter the second photoelectric conversion portion PD2). Specifically, the optical system LS1 causes the first reflection light RY1 and the second reflection light RY2 to form an image on the same conjugate position (the microlens ML) with respect to the first retina RE1 and the second retina RE2. Furthermore, the microlens ML guides the first reflection light RY1 to the first photoelectric conversion portion PD1 and guides the second reflection light RY2 to the second photoelectric conversion portion PD2.

The optical system LS1 according to the present exemplary embodiment focuses the first reflection light RY1 and the second reflection light RY2 having traveled through the respective pupils different from each other on the single image sensor IM. Thus, the image sensor IM including the first photoelectric conversion portion PD1 and the second photoelectric conversion portion PD2 can photoelectrically convert the first reflection light RY1 and the second reflection light RY2 by itself. This realizes simplification of the optical system. With this structure, the inspection apparatus 1 according to the present exemplary embodiment realizes size reduction of an optical system of an inspection apparatus capable of detecting each of the first reflection light RY1 and the second reflection light RY2.

In a case where the optical axis is an axis passing through centers of the lenses of the optical system LS1, the inspection apparatus 1 is desirably situated so that a line segment connecting centers of the first eye EY1 and the second eye EY2 is on the same plane. Furthermore, in the above-described case, more desirably, a line segment connecting centers of the first crystalline lens PP1 and the second crystalline lens PP2, a line segment connecting centers of the first pupil AP1 and the second pupil AP2, and a line segment connecting centers of the first photoelectric conversion portion PD1 and the second photoelectric conversion portion PD2 are on the same plane.

A lower diagram in FIG. 2 illustrates the image sensor IM according to a modified example of the present exemplary embodiment. Each pixel IP of the image sensor IM according to the present modified example is different from the pixel IP according to first exemplary embodiment in that each pixel IP includes a light shield portion. Each light shield portion is a member that blocks reflection light guided from the microlens ML to the first photoelectric conversion portion PD1 or the second photoelectric conversion portion PD2 and is situated to be paired with the first photoelectric conversion portion PD1 or the second photoelectric conversion portion PD2 in each pixel IP. Specifically, in each pixel IP, one of the first reflection light RY1 and the second reflection light RY2 is guided to its corresponding photoelectric conversion portion. Thus, according to the present modified example, at least two pixels IP are to be provided in order to detect the first reflection light RY1 and the second reflection light RY2. Two adjacent pixels IP among the plurality of pixels IP of the image sensor IM will be referred to as "first pixel IP1" and "second pixel IP2".

The first pixel IP1 includes a first microlens ML1, the first photoelectric conversion portion PD1, and a first light shield portion SD1. Similarly, the second pixel IP2 includes a second microlens ML2, the second photoelectric conversion portion PD2, and a second light shield portion SD2. According to the present modified example, the optical system LS1 focuses the first reflection light RY1 on each of the first microlens ML1 and the second microlens ML2 via the first pupil AP1. Similarly, the optical system LS1 focuses the second reflection light RY2 on each of the first microlens ML1 and the second microlens ML2 via the second pupil AP2. Then, the first microlens ML1 causes the first reflection light RY1 to enter the first photoelectric conversion portion PD1 and causes the second reflection light RY2 to enter the first light shield portion SD1. Similarly, the second microlens ML2 causes the first reflection light RY1 to enter the second light shield portion SD2 and causes the second reflection light RY2 to enter the second photoelectric conversion portion PD2.

According to the present modified example, the optical system LS1 has a structure similar to that according to the first exemplary embodiment, and the first reflection light RY1 and the second reflection light RY2 are photoelectrically converted by the single image sensor IM. This realizes simplification of the optical system. Furthermore, the present modified example is effective in a case where improvement in processing speed is prioritized over resolution, and with the intentionally-reduced resolution of the image sensor IM, the amount of calculation by a calculation unit 103 described below is reduced, and the inspection processing speed improves. While one first pixel IP1 is alternated with one second pixel IP2 in the lower diagram in FIG. 2, a plurality of first pixels IP1 can be alternated with a plurality of second pixels IP2.

In order to perform highly-accurate inspection while realizing a further reduction in size of the entire system including the optical system LS1 and an illumination optical system PJ described below, the optical system LS1 is desirably telecentric to the image side. According to the present exemplary embodiment, the term "telecentric" refers to a state where the chief rays of the first reflection light RY1 and the second reflection light RY2 are parallel to each other. Although, a similar effect can be produced in a case where the chief rays of the first reflection light RY1 and the second reflection light RY2 are substantially parallel to each other in a similar manner to a case where the chief rays of the first reflection light RY1 and the second reflection light RY2 are parallel to each other. Further, in order to perform highly-accurate inspection while realizing size reduction, the structure of the optical system LS1 is desirably set as appropriate. Specifically, the optical system LS1 according to the present exemplary embodiment desirably satisfies the following inequality (1):

$$0.50 \leq |\beta| \leq 1.30 \quad (1),$$

where $\beta$ is a lateral magnification of the optical system LS1.

In a case where the lateral magnification of the optical system LS1 is greater than the upper limit of inequality (1), the difference between the incident angles of the first reflection light RY1 and the second reflection light RY2 on the microlens ML becomes small. Thus, the optical system LS1 becomes complicated in order to make the optical system LS1 telecentric. Therefore, the lateral magnification of the optical system LS1 that is greater than the upper limit of inequality (1) is undesirable. On the other hand, in a case where the lateral magnification of the optical system LS1 is less than the lower limit of inequality (1), various aberrations occur frequently as a result that an f-number of the optical system LS1 on the image side becomes excessively small, or the amount of light received by the image sensor IM decreases as a result that an f-number of the optical system LS1 on the object side becomes excessively great. Therefore, the lateral magnification of the optical system LS1 that is less than the lower limit of inequality (1) is undesirable. Furthermore, the optical system LS1 according to the present exemplary embodiment desirably satisfies the following inequality (1a) and more desirably satisfies the following inequality (1b):

$$0.60 \leq |\beta| 1.25 \quad (1a), \text{ and}$$

$$0.65 \leq |\beta| 1.20 \quad (1b).$$

Figure 3:
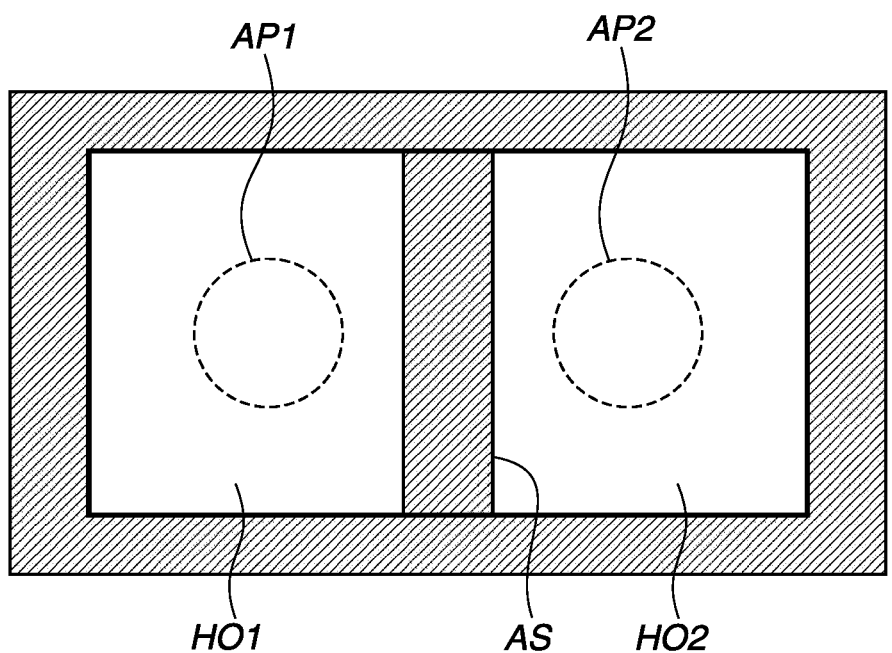
FIG. 3 is a diagram illustrating an aperture stop surface of an optical system.

Next, FIG. 3 will be described below. FIG. 3 is a diagram illustrating the aperture stop AP viewed from the object side of the optical system LS1. The aperture stop AP is a light shield member with a hole. According to the present exemplary embodiment, the aperture stop AP includes hole portions HO1 and HO2. A boundary between the hole portions HO1 and HO2 of the aperture stop AP is separated by a central light shield member AS, which is a light shield member. The central light shield member AS blocks unwanted light (ghost light) at the boundary between the hole portions HO1 and HO2. The first reflection light RY1 travels through the first pupil AP1 in the first hole portion HO1, and the second reflection light RY2 travels through the second pupil AP2 in the second hole portion HO2. With this structure, unwanted light (ghost light) reflected inside the inspection apparatus 1 is reduced. While the first hole portion HO1 and the second hole portion HO2 of the aperture stop AP each have a rectangular shape in FIG. 3, the shapes of the first hole portion HO1 and the second hole portion HO2 are not limited to rectangular shapes and can be other shapes such as elliptical shapes.

Further, an optical element configured to provide an effect similar to that of the aperture stop AP can be provided instead of the aperture stop AP. Specifically, the first hole portion HO1 and the second hole portion HO2 can be formed by providing a light shield film on an optical surface of the optical element. Use of a light shield member at the boundary portion between the regions of the first hole portion HO1 and the second hole portion HO2 realizes effective reduction in unwanted light.

Figure 4:
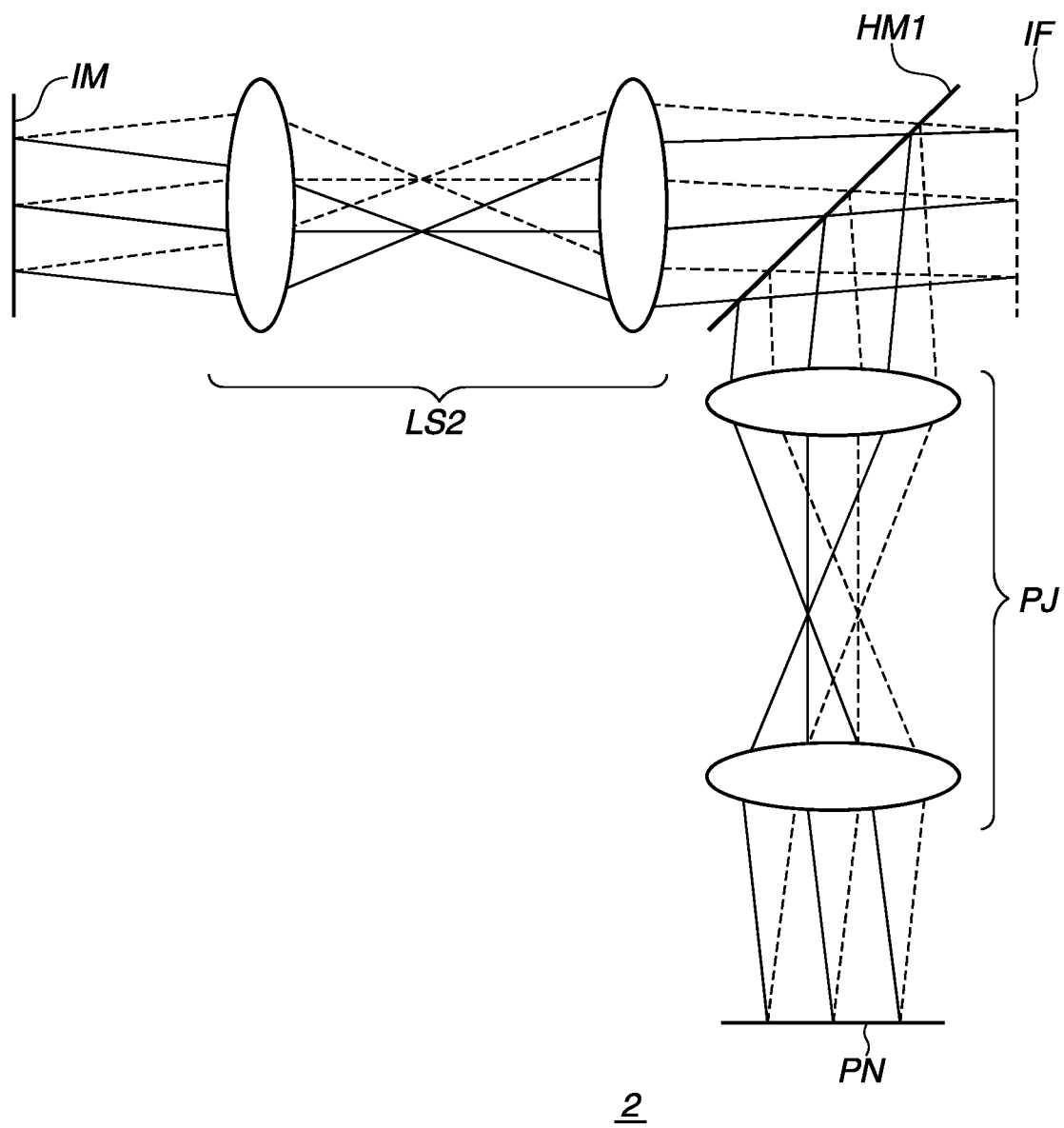
FIG. 4 is a schematic diagram illustrating a main portion of an inspection apparatus according to a second exemplary embodiment.

FIG. 4 is a schematic diagram illustrating a main portion of an inspection apparatus 2 according to a second exemplary embodiment. The inspection apparatus 2 according to the present exemplary embodiment is different from the inspection apparatus 1 according to the first exemplary embodiment in that the inspection apparatus 2 includes a first light source PN (first light source unit), the illumination optical system PJ, and a beam splitter HM1. The first light source PN emits illumination light. The first light source PN can be formed by, for example, a display member such as a liquid crystal display or an organic electroluminescent (organic EL) display and one or more point light sources such as laser diodes. In this case, the illumination optical system PJ can be changed as suitable for the first light source PN. Further, a polarization state of light emitted from the illumination optical system PJ to the first retina RE1 and the second retina RE2 of the first eye EY1 and the second eye EY2 of the subject is desirably a circularly-polarized state. The illumination light having traveled through the illumination optical system PJ is reflected by the beam splitter HM1 and then focused on a position corresponding to the intermediate image IF. The focused illumination light forms an image on the first retina RE1 and the second retina RE2 via the first crystalline lens PP1 and the second crystalline lens PP2. Meanwhile, the first reflection light RY1 and the second reflection light RY2 focused on a position corresponding to the intermediate image IF travel through the beam splitter HM1 and an optical system LS2 and then form an image on the imaging plane of the image sensor IM. Specifically, the first light source PN, the position corresponding to the intermediate image IF, the first retina RE1 and the second retina RE2, and the image sensor IM are each a conjugate plane.

According to the present exemplary embodiment, as in the first exemplary embodiment, the first reflection light RY1 and the second reflection light RY2 having traveled through the respective pupils different from each other are focused on the single image sensor IM, and the image sensor IM alone can photoelectrically convert the first reflection light RY1 and the second reflection light RY2. This realizes optical system simplification. Thus, the inspection apparatus 2 according to the present exemplary embodiment realizes a reduction in size of an optical system of an inspection apparatus capable of detecting each of the first reflection light RY1 and the second reflection light RY2. Furthermore, with the first light source PN and the illumination optical system PJ, a sufficient amount of illumination light is applied to the first retina RE1 and the second retina RE2 of the subject. This can improve inspection accuracy.

Further, in order to perform highly-accurate inspection and to reduce a burden on the first eye EY1 and the second eye EY2 of the subject, the structure of the first light source PN is desirably set as appropriate. Specifically, the first light source PN according to the present exemplary embodiment desirably satisfies the following inequality (2):

$$800 \text{ nm} \leq \lambda \leq 900 \text{ nm} \tag{2}$$

where $\lambda$ is a wavelength of light.

In a case where the wavelength of light is greater than the upper limit of inequality (2), the light is reflected after being transmitted deeply from a retinal surface. This decreases the amount of reflection light from the first retina RE1 and the second retina RE2. Thus, the wavelength of light that is greater than the upper limit of inequality (2) is undesirable as a wavelength of light for use in retinal inspection. On the other hand, in a case where the wavelength of light is less than the lower limit of inequality (2), the illumination light becomes visible light. In a case where the illumination light is visible light, the subject illuminated with a necessary amount of light for inspection may feel that the light is too bright and may avert or close the first eye EY1 and the second eye EY2 of the subject. Thus, the wavelength of light that is less than the lower limit of inequality (2) is undesirable.

Figure 5:
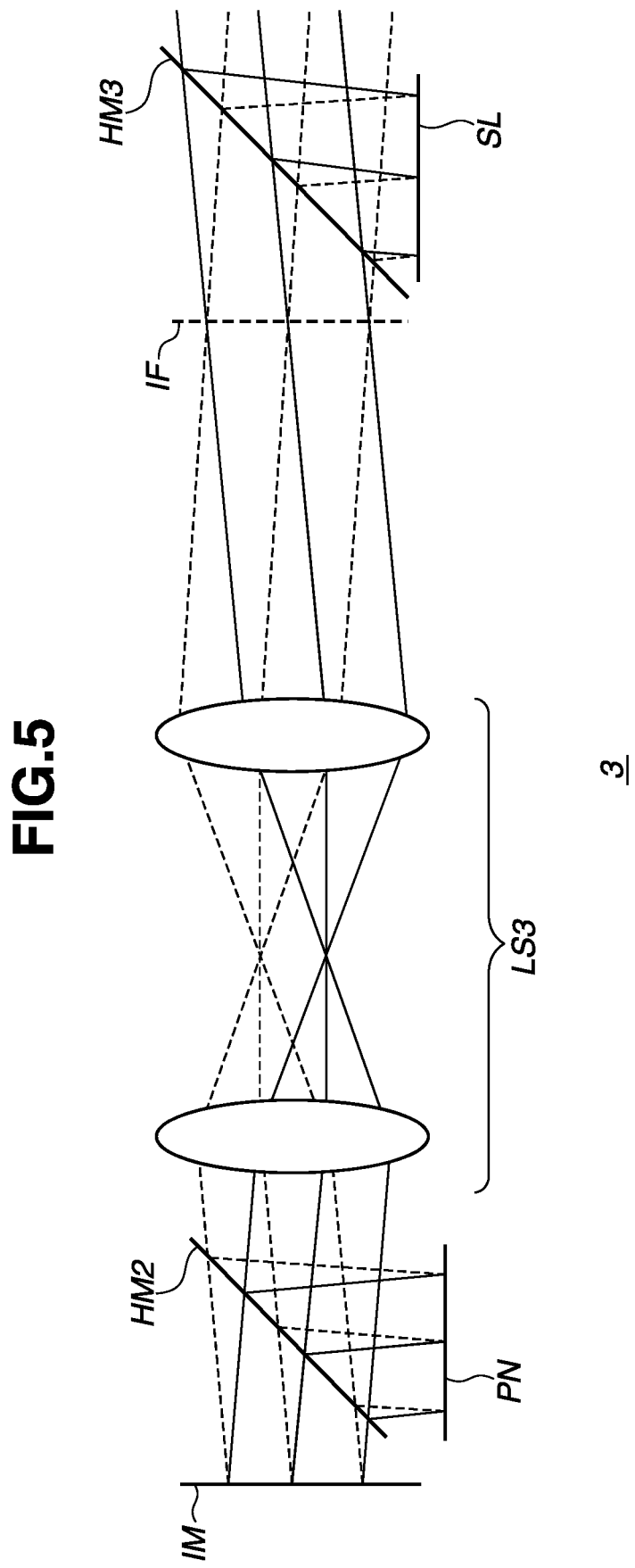
FIG. 5 is a schematic diagram illustrating a main portion of an inspection apparatus according to a third exemplary embodiment.

FIG. 5 is a schematic diagram illustrating a main portion of an inspection apparatus 3 according to third exemplary embodiment. The inspection apparatus 3 according to the present exemplary embodiment is different from the inspection apparatus 1 according to the first exemplary embodiment in that the inspection apparatus 3 includes the first light source PN, a second light source SL (second light source unit), and beam splitters HM2 and HM3. The first light source PN is similar to that according to the second exemplary embodiment.

The beam splitter HM2 is situated nearer to the image side than an optical system LS3 is. Further, the beam splitter HM2 reflects the illumination light toward the optical system LS3. Meanwhile, the beam splitter HM2 transmits reflection light from the first retina RE1 and the second retina RE2 that has traveled through the optical system LS3. The second light source SL is a light source (fixation lamp) for directing a line of sight of the subject. The second light source SL can be formed by a display member such as a liquid crystal display or an organic EL display and one or more point light sources such as laser diodes. The wavelength of light emitted from the second light source SL is desirably within the visible range that can be recognized visually by the subject during inspection.

Further, the first light source PN and the second light source SL can be formed by a single display member capable of emitting light of a plurality of wavelengths. The beam splitter HM3 reflects light emitted by the second light source SL toward the object side. Meanwhile, the beam splitter HM3 transmits the illumination light reflected by the beam splitter HM2 and reflection light reflected by the first retina RE1 and the second retina RE2. According to the present exemplary embodiment, the illumination light reflected by the beam splitter HM2 travels through the optical system LS3 and is then focused on the position corresponding to the intermediate image IF. The focused illumination light having traveled through the beam splitter HM3 travels through the first crystalline lens PP1 and the second crystalline lens PP2 and then forms an image on each of the first retina RE1 and the second retina RE2. Meanwhile, the first reflection light RY1 reflected by the retina RE1 and the second reflection light RY2 reflected by the retina RE2 travel through the beam splitter HM3 and are then focused on the position corresponding to the intermediate image IF. The focused first reflection light RY1 and the focused second reflection light RY2 travel through the optical system LS3 and the beam splitter HM2 and are then focused on the imaging plane of the image sensor IM. Further, light emitted by the second light source SL is reflected by the beam splitter HM3 and then enters the first eye EY1 and the second eye EY2. Desirably, optical path lengths from the position on which the light emitted from the second light source SL is focused to the first eye EY1 and the second eye EY2 and optical path lengths from the position corresponding to the intermediate image IF to the first eye EY1 and the second eye EY2 substantially match.

According to the present exemplary embodiment, as in the first exemplary embodiment, the first reflection light RY1 and the second reflection light RY2 having traveled through the respective pupils different from each other are focused on the single image sensor IM, and the image sensor IM alone can photoelectrically convert the first reflection light RY1 and the second reflection light RY2. This realizes simplification of the optical system. Thus, the inspection apparatus 3 according to the present exemplary embodiment realizes a reduction in size of an optical system of an inspection apparatus capable of detecting each of the first reflection light RY1 and the second reflection light RY2. Furthermore, with the second light source SL, the attention (line of sight) of the subject is directed to the inspection apparatus 3, and the inspection is performed promptly.

Figure 6:
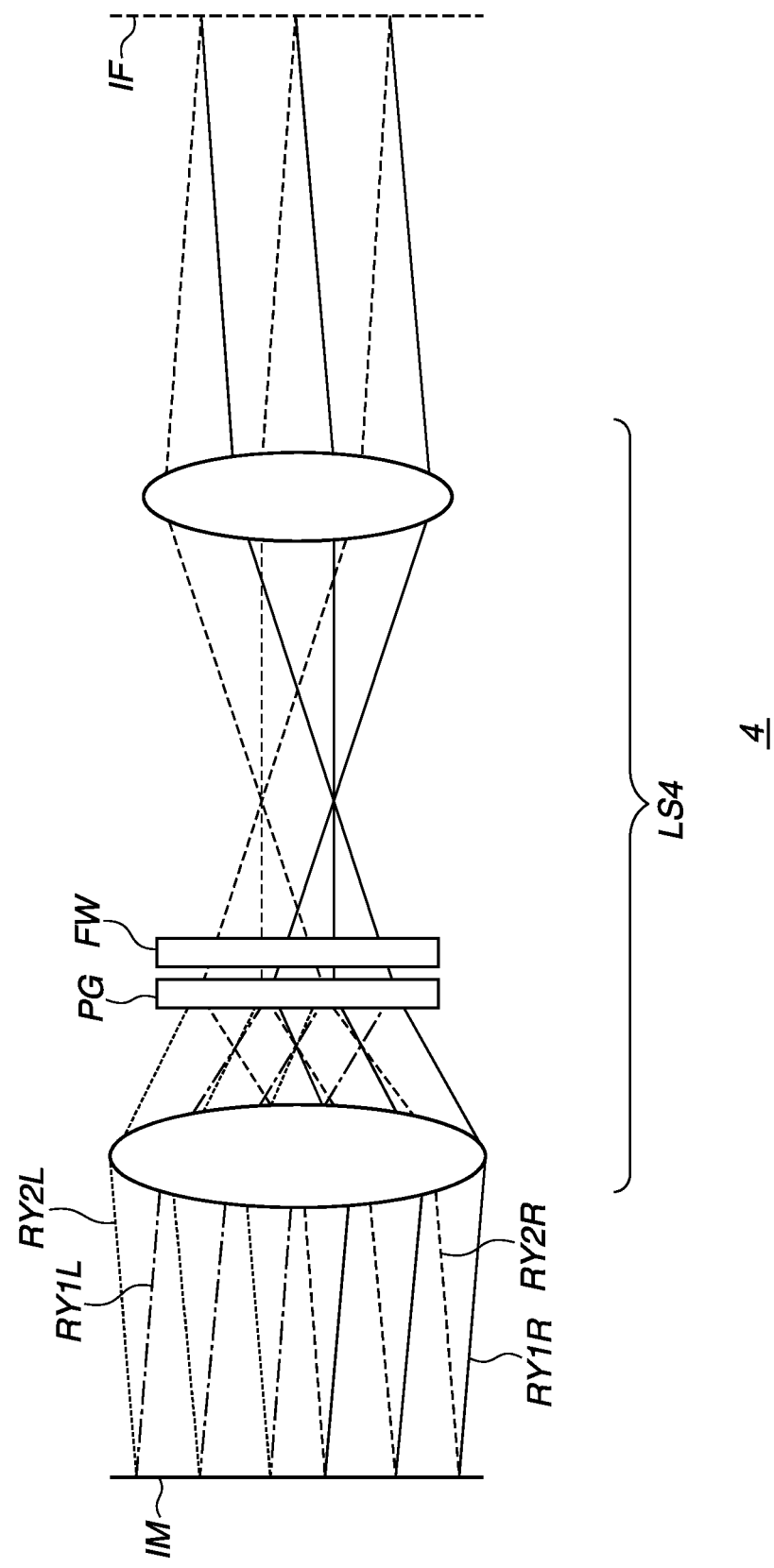
FIG. 6 is a schematic diagram illustrating a main portion of an inspection apparatus according to a fourth exemplary embodiment.

FIG. 6 is a schematic diagram illustrating a main portion of an inspection apparatus 4 according to a fourth exemplary embodiment. The inspection apparatus 4 according to the present exemplary embodiment is different from the inspection apparatus 1 according to the first exemplary embodiment in that a polarization element for changing a polarization state of the first reflection light RY1 and the second reflection light RY2 is provided in an optical system LS4. According to the present exemplary embodiment, a quarter-wave plate FW and a polarization diffraction element PG are used. The quarter-wave plate FW separates the first reflection light RY1 into a light ray RY1R in a first phase state and a light ray RY1L in a second phase state. Similarly, the quarter-wave plate FW separates the second reflection light RY2 into a light ray RY2R in the first phase state and a light ray RY2L in the second phase state. The first phase state and the second phase state according to the present exemplary embodiment are light rays having a phase difference of 90 degrees with respect to each other. Further, the polarization element is not limited to those described above, and a one-eighth wave plate or a half-wave plate can be used. The polarization diffraction element PG corrects aberrations that occur in the optical system LS4. By detecting reflection light from the first retina RE1 and the second retina RE2 using the polarization element, the birefringence at the reflection position is measured.

According to the present exemplary embodiment, as in the first exemplary embodiment, the first reflection light RY1 and the second reflection light RY2 having traveled through the respective pupils different from each other are focused on the single image sensor IM, and the image sensor IM alone can photoelectrically convert the first reflection light RY1 and the second reflection light RY2. This realizes simplification of the optical system. Thus, the inspection apparatus 4 according to the present exemplary embodiment realizes size reduction of an optical system of an inspection apparatus capable of detecting each of the first reflection light RY1 and the second reflection light RY2. Furthermore, with the polarization element provided in the optical system LS4, a specific polarization state of the first reflection light RY1 and the second reflection light RY2 is changed. Thus, the birefringence at the first retina RE1 and the second retina RE2 can be measured. This makes it possible to inspect a fixation state of the first eye EY1 and the second eye EY2 with higher accuracy.

While the optical system LS4 separates the first reflection light RY1 and the second reflection light RY2 so that an image forming position (the microlens ML) of the light ray RY1R and the light ray RY2R and an image forming position (the microlens ML) of the light ray RY1L and the light ray RY2L do not overlap with each other in FIG. 6, the image forming positions can overlap partially. Specifically, light rays in different phase states that are separated from the same reflection light can be focused on the same position (the microlens ML) at the same incident angle. At this time, time-division (time-sharing) is used on the light rays guided to the same photoelectric conversion portion by the microlens ML to convert each of the light ray RY1R, the light ray RY1L, the light ray RY2R, and the light ray RY2L into an electric signal.

The foregoing processing is performed by the calculation unit 103 described below.

Figure 7:
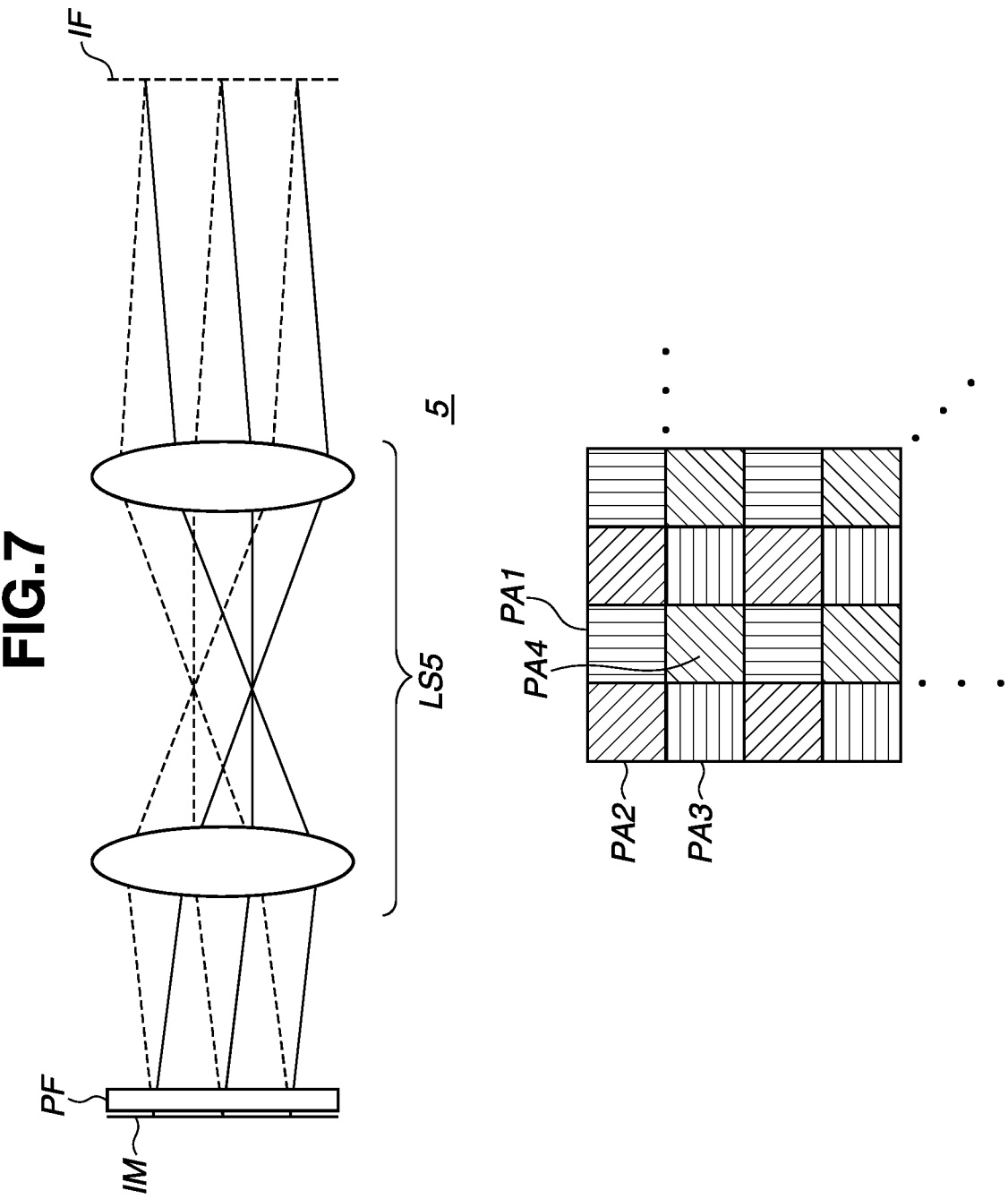
FIG. 7 is a schematic diagram illustrating a main portion of an inspection apparatus according to a fifth exemplary embodiment.

An upper diagram in FIG. 7 is a schematic diagram illustrating a main portion of an inspection apparatus 5 according to a fifth exemplary embodiment. A lower diagram in FIG. 7 is a schematic diagram illustrating a polarization element PF according to the present exemplary embodiment. The inspection apparatus 5 according to the present exemplary embodiment is different from the inspection apparatus 1 according to the first exemplary embodiment in that the polarization element PF for changing a polarization state of the first reflection light RY1 and the second reflection light RY2 is situated nearer to the image side than the optical system LS5 is. The polarization element PF according to the present exemplary embodiment includes a plurality of polarization planes PA1, a plurality of polarization planes PA2, a plurality of polarization planes PA3, and a plurality of polarization planes PA4. The polarization planes PA1, PA2, PA3, and PA4 of the polarization element PF according to the present exemplary embodiment transmit linearly-polarized light of 0°, 45°, 90°, and 135° directions, respectively, and a surface area of each polarization plane is substantially equal to a surface area of each pixel IP. The size of each polarization plane is not limited to that described above, and a surface area of each polarization plane can be substantially equal to a surface area of a plurality of pixels IP. In one embodiment, the polarization element PF transmits only light rays in a polarization state corresponding to a polarization plane of an incident light ray. Thus, only the first reflection light RY1 and the second reflection light RY2 that have a polarization state corresponding to a transmitted polarization plane are focused on the same position (the microlens ML) by an optical system LS5.

According to the present exemplary embodiment, as in the first exemplary embodiment, the first reflection light RY1 and the second reflection light RY2 having traveled through the respective pupils different from each other are focused on the single image sensor IM, and the image sensor IM alone can photoelectrically convert the first reflection light RY1 and the second reflection light RY2. This realizes simplification of the optical system. Thus, the inspection apparatus 5 according to the present exemplary embodiment realizes a reduction in size of an optical system of an inspection apparatus capable of detecting each of the first reflection light RY1 and the second reflection light RY2. Furthermore, with the polarization element PF situated nearer to the image side than the optical system LS5 is, a specific polarization state of the first reflection light RY1 and the second reflection light RY2 is changed. Thus, the birefringence at the first retina RE1 and the second retina RE2 can be measured. This makes it possible to inspect a fixation state of the first eye EY1 and the second eye EY2 with higher accuracy.

An arrangement of the polarization element PF is not limited to that illustrated in the lower diagram in FIG. 7, and the positions and numbers of the polarization planes PA1, PA2, PA3, and PA4 of the polarization element PF can be changed as appropriate. For example, in one embodiment, the polarization element PF can include the polarization planes PA1 and PA3 only, the polarization planes PA2 and PA4 only, or five or more polarization planes.

Figure 8:
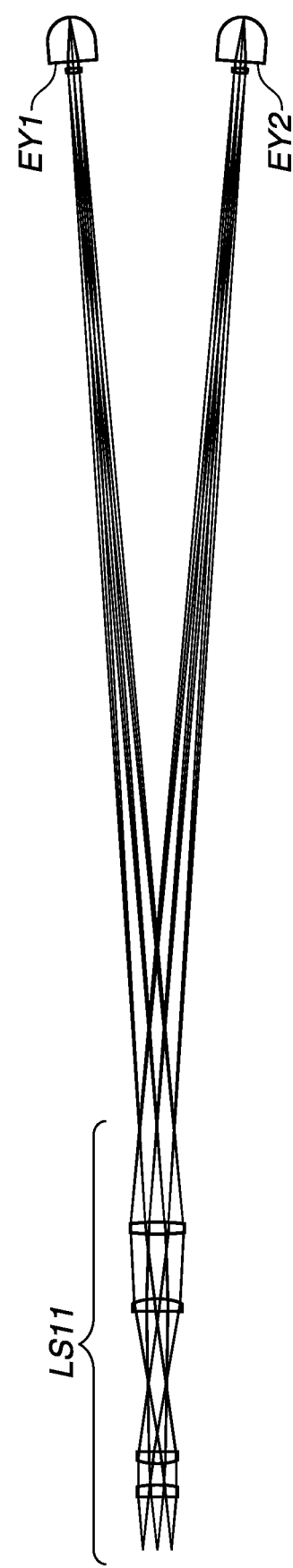
FIG. 8 is a schematic diagram illustrating a main portion of an optical system according to a first numerical example.
Figure 9:
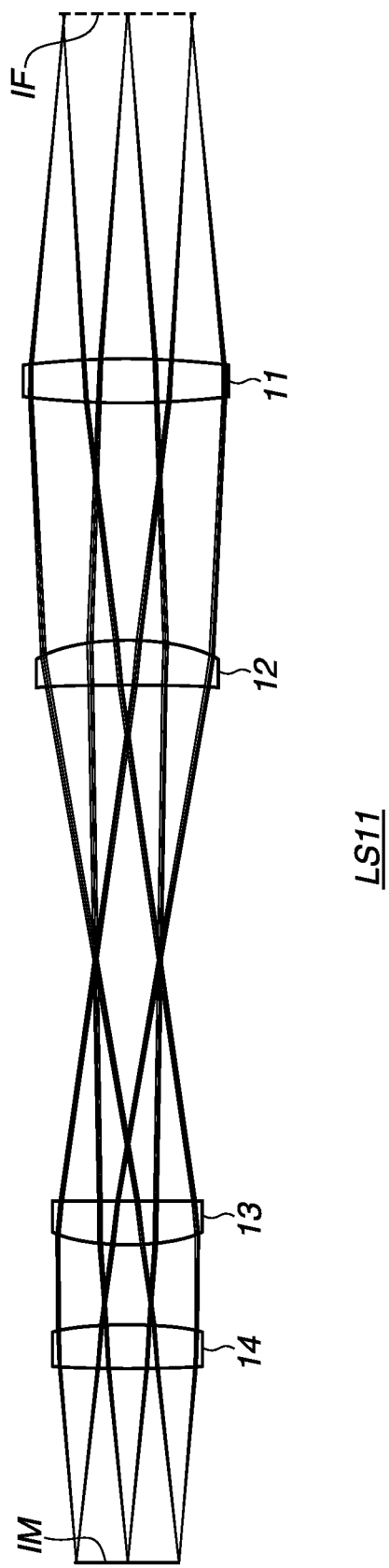
FIG. 9 is an enlarged view illustrating the optical system according to the first numerical example.
Figure 10:
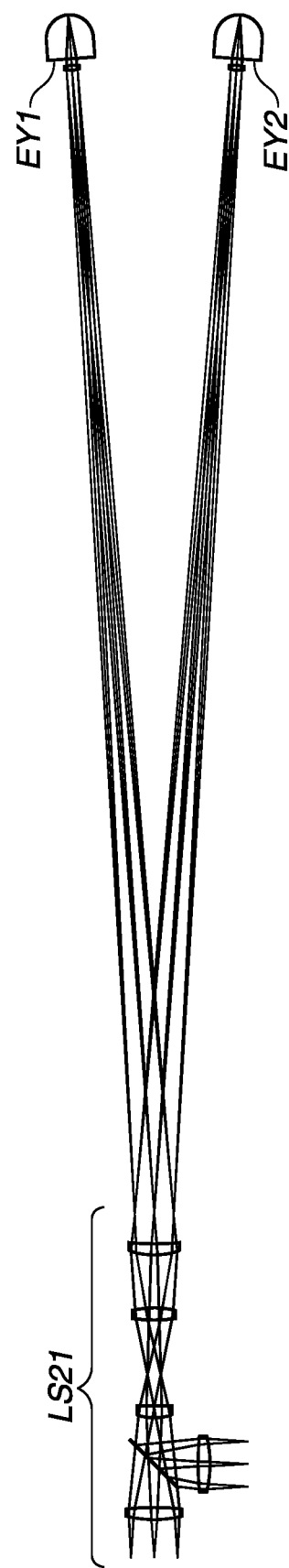
FIG. 10 is a schematic diagram illustrating a main portion of an optical system according to a second numerical example.
Figure 11:
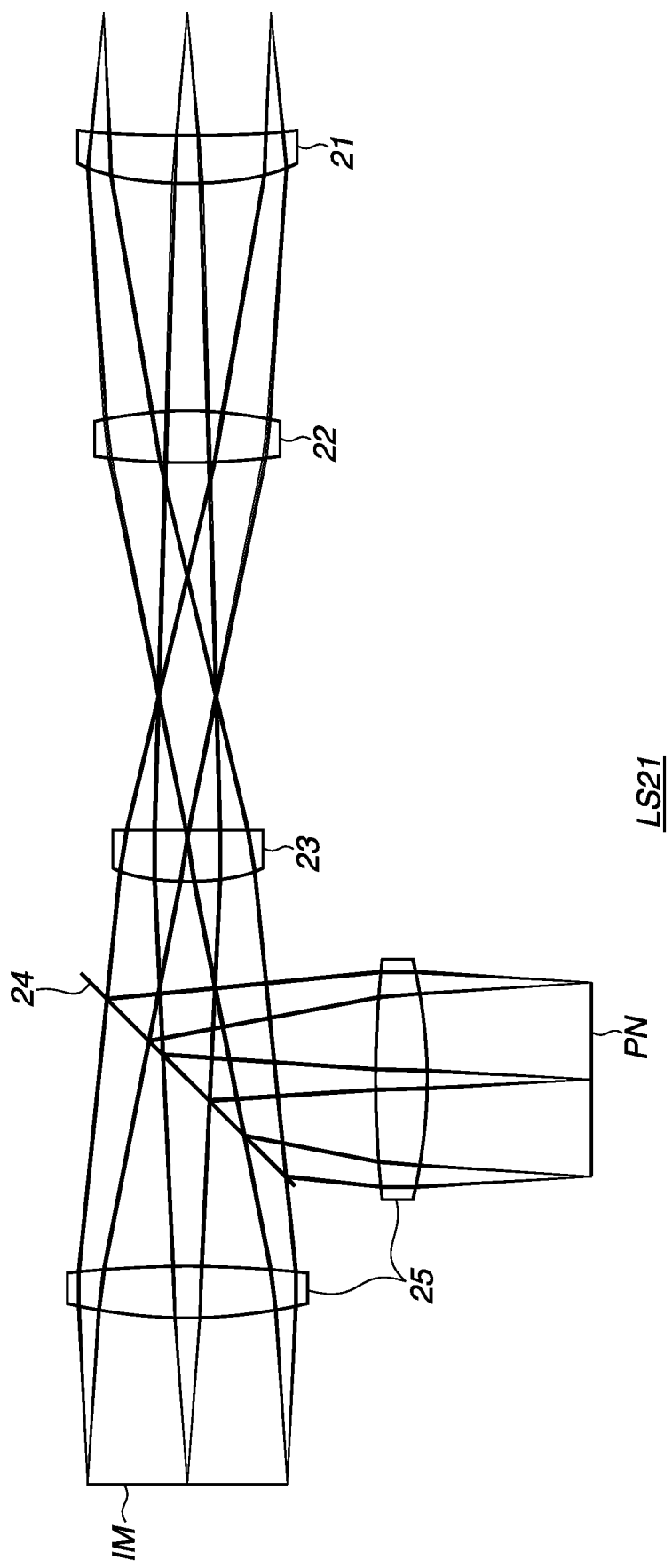
FIG. 11 is a schematic diagram illustrating the main portion of the optical system according to the second numerical example.
Figure 12:
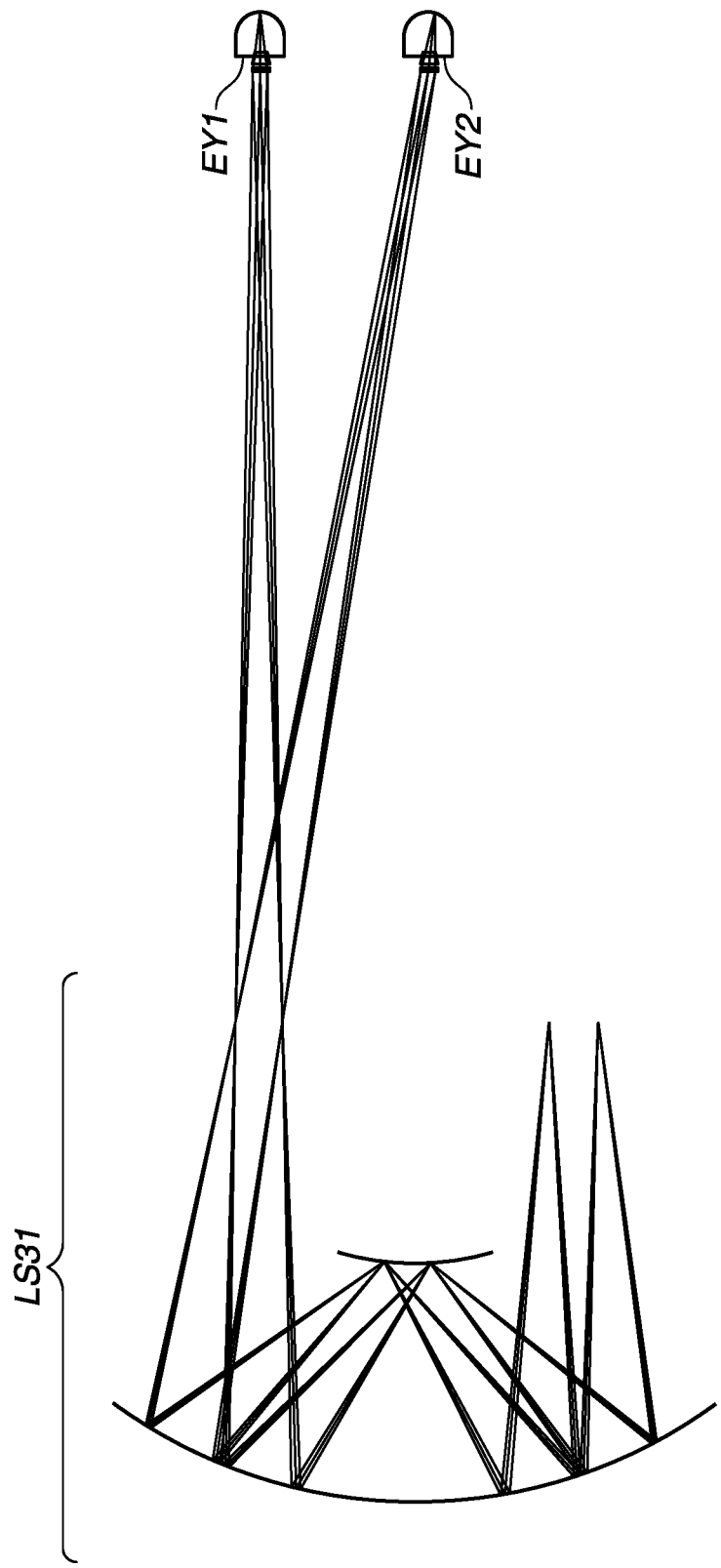
FIG. 12 is a schematic diagram illustrating a main portion of an optical system according to a third numerical example.
Figure 13:
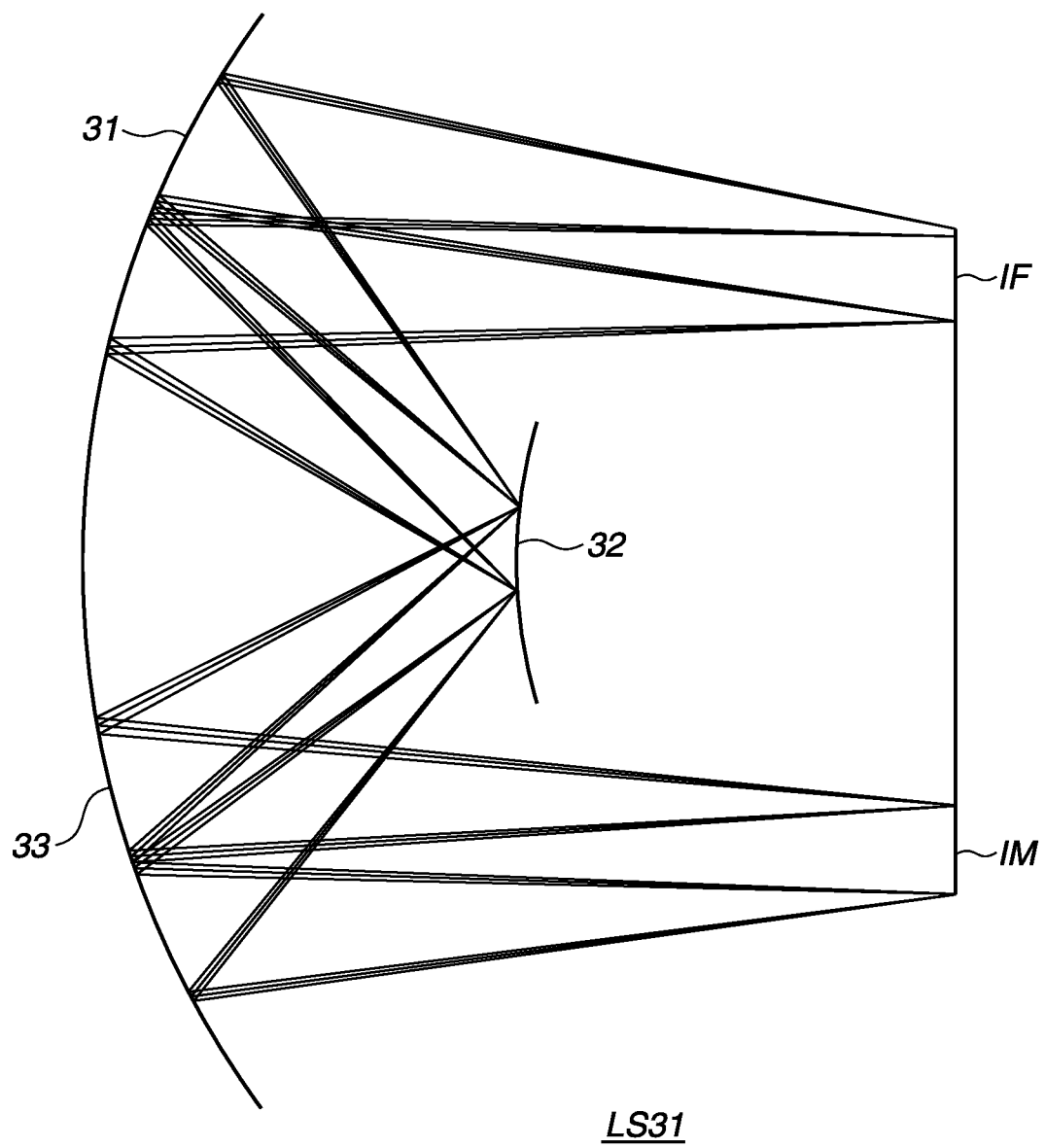
FIG. 13 is a schematic diagram illustrating the main portion of the optical system according to the third numerical example.

Next, various numerical examples will be described below. FIGS. 8, 10, and 12 are schematic diagrams illustrating main portions of optical systems according to first to third numerical examples. Further, FIGS. 9, 11, and 13 are enlarged views illustrating the optical systems according to the first to third numerical examples. Refractive optical elements 11, 12, 13, and 14 in FIG. 9 and refractive optical elements 21, 22, 23, and 25 in FIG. 11 are lenses and prisms. Further, the optical system illustrated in FIG. 11 includes a beam splitter 24, and reflective optical elements 31, 32, and 33 in FIG. 13 are mirrors.

Numerical data corresponding to the first to third numerical examples will be described below. In the numerical data, r is a radius of curvature of the ith surface, where i is a number of an optical surface counted from the object side, d is an on-axis space (distance on an optical axis) between the ith surface and the (i+1)th surface, nd is a refractive index of a medium between the ith surface and the (i+1)th surface with respect to the d-line, and vd is an Abbe number of the medium with respect to the d-line. Further, a "focal length" is a focal length of an entire system at infinity focus, a "half angle of view" is an imaging half angle of view (degree), and BF is an air-equivalent value of back focus. The Abbe number vd is a value defined by the following formula:

$$vd=(nd-1)/(nF-nC),$$

where nF, nd, and nC are refractive indexes with respect to the F-line (486.13 nm), the d-line (587.56 nm), and the C-line (656.27 nm), respectively.

While each optical surface according to the first to third numerical examples is a rotationally symmetric spherical surface, a rotationally symmetric aspherical surface, an anamorphic surface, or a free-form surface can be used as appropriate. Further, a cover glass and/or a dust-proof glass can be provided on an optical path. Furthermore, an eccentric system and/or a return using a reflective surface can be used as suitable for an apparatus layout.

First Numerical Example

| Surface Number | | r | d | nd | vd |
| --- | --- | --- | --- | --- | --- |
| 1 | IF | 0.00 | 40.45 | 1.000 | |
| 2 | 11 | 80.14 | 5.00 | 1.516 | 64.14 |
| 3 | | −83.95 | 28.08 | 1.000 | |
| 4 | 12 | 29.06 | 5.00 | 1.516 | 64.14 |
| 5 | | 85.61 | 28.15 | 1.000 | |
| 6 | AP | 0.00 | 32.44 | 1.000 | |
| 7 | 13 | 1790.48 | 5.00 | 1.516 | 64.14 |
| 8 | | −29.60 | 9.23 | 1.000 | |
| 9 | 14 | 99.88 | 5.00 | 1.516 | 64.14 |
| 10 | | −108.10 | 22.97 | 1.000 | |
| 11 | IM | 0.00 | 0.00 | 1.000 | |

Second Numerical Example

| Surface Number | | r | d | nd | vd |
| --- | --- | --- | --- | --- | --- |
| 1 | IF | 0.00 | 12.24 | 1.000 | |
| 2 | 21 | −149.06 | 5.10 | 1.516 | 64.14 |
| 3 | | −28.91 | 22.95 | 1.000 | |
| 4 | 22 | 41.39 | 5.10 | 1.487 | 70.23 |
| 5 | | −91.85 | 21.78 | 1.000 | |
| 6 | AP | 0.00 | 15.74 | 1.000 | |
| 7 | 23 | 927.76 | 5.10 | 1.487 | 70.23 |
| 8 | | −25.97 | 20.00 | 1.000 | |
| 9 | 24 | 0.00 | 19.13 | 1.000 | |
| 10 | 25 | 112.77 | 5.10 | 1.516 | 64.14 |
| 11 | | −52.53 | 16.73 | 1.000 | |
| 12 | IM | 0.00 | 0.00 | 1.000 | |

Third Numerical Example

| Surface Number | | r | d | nd | vd |
| --- | --- | --- | --- | --- | --- |
| 1 | IF | 0.00 | −200.00 | 1.000 | |
| 2 | 31 | −200.00 | 100.00 | 1.000 | |
| 3 | 32 | −100.00 | −100.00 | 1.000 | |
| 4 | 33 | −200.00 | 200.00 | 1.000 | |
| 5 | IM | 0.00 | 0.00 | 1.000 | |

Values of lateral magnifications R of optical systems LS11, LS21, and LS31 according to the first to third numerical examples are shown in Table 1 below.

TABLE 1

| | First Numerical Example | Second Numerical Example | Third Numerical Example |
| --- | --- | --- | --- |
| $|\beta|$ | 0.80 | 1.16 | 1.00 |

Figure 14:
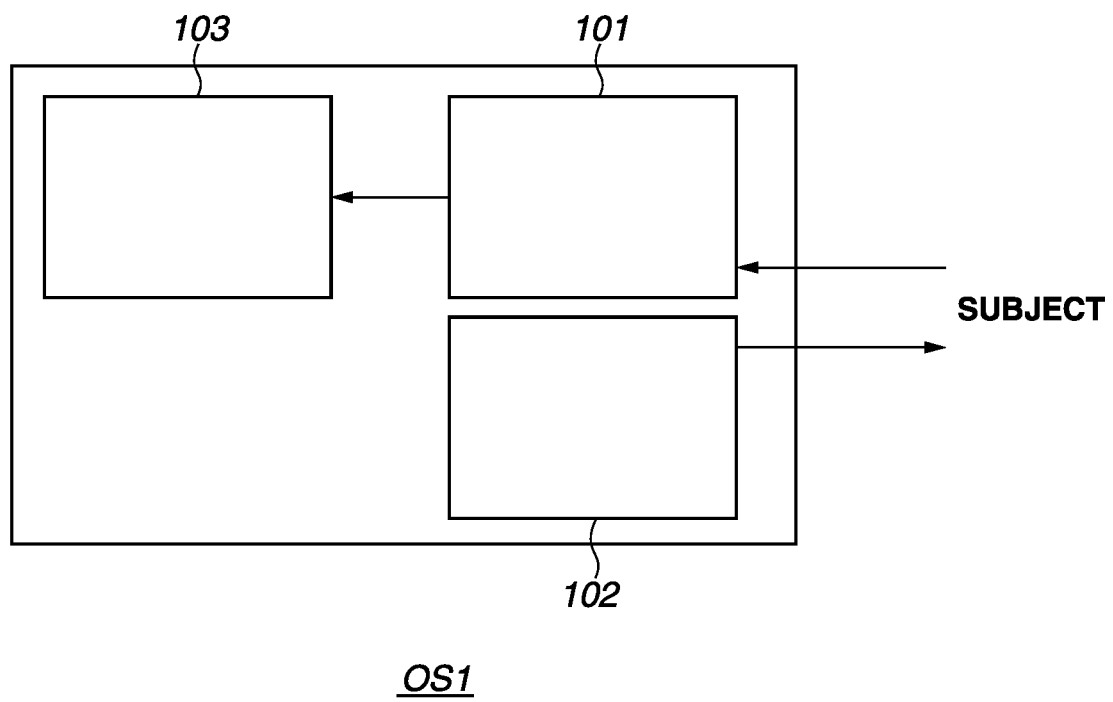
FIG. 14 is a block diagram illustrating an inspection apparatus according to an exemplary embodiment.

Next, an inspection apparatus OS1 will be described below with reference to FIG. 14. FIG. 14 is a block diagram illustrating the inspection apparatus OS1. The inspection apparatus OS1 includes a light source unit 101, an imaging unit 102, and the calculation unit 103.

The light source unit 101 includes the first light source PN equivalent to that according to one of the second and third exemplary embodiments and the illumination optical system PJ and emits illumination light to eyes of a subject.

The imaging unit 102 includes an optical system LS equivalent to one of the optical systems LS1 to LS5 according to the first to fifth exemplary embodiments and the image sensor IM, and detects reflection light from retinas (fundi) of the eyes of the subject. Further, the imaging unit 102 acquires retinal birefringence information by detecting the reflection light from the retinas using a polarization-related optical element as in the fourth or fifth exemplary embodiment. The imaging unit 102 can simultaneously acquire reflection light from the right eye of the subject and reflection light from the left eye of the subject. Part of the optical elements of the illumination optical system PJ of the light source unit 101 and the optical elements of the optical system LS of the imaging unit 102 can be included in both the illumination optical system PJ and the optical system LS as needed. With this structure, further size reduction of an inspection apparatus is realized.

The calculation unit 103 processes reflection light information and estimates a fixation state based on electric signals converted photoelectrically by the image sensor IM of the imaging unit 102. A method for estimating a fixation state based on information acquired by an imaging apparatus is similar to a method discussed in Japanese Unexamined Patent Application Publication (Translation of PCT Application) No. 2018-509203, so that redundant descriptions thereof are omitted.

A processor in an inspection apparatus, an external apparatus, or another storage medium can be used as the calculation unit 103. The calculation unit 103 generates first information and second information corresponding to right and left eyes based on electric signals acquired from a first photoelectric conversion portion and a second photoelectric conversion portion by performing signal processing or image processing. In a case where polarization states are different, information for each polarization state can further be generated. The first information and the second information include one of image information, luminance information, and polarization state information. Further, the calculation unit 103 can measure the retinal birefringence based on a change in the polarization state between illumination light to the retinas and reflection light from the retinas. Furthermore, the calculation unit 103 can separate information for each of a plurality of polarization states for the right and the left based on the acquired electric signals.

While various exemplary embodiments of the disclosure have been described above, the disclosure is not limited to the exemplary embodiments, and various modifications and changes can be made within the spirit of the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-085101, filed May 25, 2022, which is hereby incorporated by reference herein in its entirety.

What is claimed is:

1. An inspection apparatus configured to detect first light from a first eye of a subject and second light from a second eye of the subject, the inspection apparatus comprising:
   an optical system;
   an image sensor,
   a first light source unit configured to emit illumination light; and
   an illumination optical system configured to guide the illumination light from the first light source unit to an object side,
   wherein the image sensor includes a pixel including a microlens, a first conversion portion, and a second conversion portion,
   wherein the optical system focuses the first light on the microlens via a first pupil and focuses the second light on the microlens via a second pupil, and
   wherein the microlens causes the first light to enter the first conversion portion and causes the second light to enter the second conversion portion, and
   wherein the following inequality is satisfied:

$$800 \text{ nm} \leq \lambda \leq 900 \text{ nm},$$

where $\lambda$ is a wavelength of the illumination light emitted by the first light source unit,
   wherein in a case where the wavelength is greater than the upper limit of the inequality, the illumination light is reflected after being transmitted from a retinal surface that results to a decrease an amount of reflection light for retinas, and
   wherein in a case where the wavelength is less than the lower limit of the inequality, the illumination light becomes visible light that results the light being too bright to avert or close the eyes of the subject.

2. The inspection apparatus according to claim 1, wherein the optical system causes the first light and the second light to enter the microlens from respective sides different from each other with respect to a cross section including an axis of the microlens.

3. An inspection apparatus configured to detect first light from a first eye of a subject and second light from a second eye of the subject, the inspection apparatus comprising:
   an optical system;
   an image sensor,
   a first light source unit configured to emit illumination light; and
   an illumination optical system configured to guide the illumination light from the first light source unit to an object side,
   wherein the image sensor includes a first pixel including a first microlens, a first conversion portion, and a first light shield portion and a second pixel including a second microlens, a second conversion portion, and a second light shield portion,
   wherein the optical system focuses the first light on the first microlens and the second microlens via a first pupil and focuses the second light on the first microlens and the second microlens via a second pupil,
   wherein the first microlens causes the first light to enter the first conversion portion and causes the second light to enter the first light shield portion,
   wherein the second microlens causes the first light to enter the second light shield portion and causes the second light to enter the second conversion portion,
   wherein the following inequality is satisfied:

$$800 \text{ nm} \leq \lambda \leq 900 \text{ nm},$$

where $\lambda$ is a wavelength of the illumination light emitted by the first light source unit,
   wherein in a case where the wavelength is greater than the upper limit of the inequality, the illumination light is reflected after being transmitted from a retinal surface that results to a decrease an amount of reflection light for retinas, and
   wherein in a case where the wavelength is less than the lower limit of the inequality, the illumination light becomes visible light that results the light being too bright to avert or close the eyes of the subject.

4. The inspection apparatus according to claim 1, wherein an intermediate image of the first eye is formed between the optical system and the first eye, and an intermediate image of the second eye is formed between the optical system and the second eye.

5. The inspection apparatus according to claim 1, wherein the optical system further includes a light shield portion with a hole.

6. The inspection apparatus according to claim 1, wherein the optical system further includes a polarization element configured to change a polarization state of the first light and the second light.

7. The inspection apparatus according to claim 1, further comprising a polarization element nearer to an image side than the optical system is, the polarization element being configured to change a polarization state of the first light and the second light.

8. The inspection apparatus according to claim 1, wherein the optical system is telecentric to an image side.

9. The inspection apparatus according to claim 1, wherein the following inequality is satisfied:

$$0.5 \leq |\beta| \leq 1.3,$$

where $\beta$ is a lateral magnification of the optical system.

10. The inspection apparatus according to claim 1, wherein the illumination optical system forms an intermediate image of the illumination light.

11. The inspection apparatus according to claim 1, wherein the optical system and the illumination optical system include a common element.

12. The inspection apparatus according to claim 1, further comprising a second light source unit configured to emit visible light to illuminate the first eye and the second eye.

13. The inspection apparatus according to claim 1, further comprising:
- at least one processor; and
- a memory coupled to the at least one processor, the memory having instructions that, when executed by the processor, causes the at least one processor to function as:
- a calculation unit configured to generate information about the first light and the second light based on an electric signal converted photoelectrically by the first conversion portion and an electric signal converted photoelectrically by the second conversion portion.

14. The inspection apparatus according to claim 13, wherein the information about the first light and the second light includes at least one of image information, luminance information, and a polarization state.

15. The inspection apparatus according to claim 13, wherein the calculation unit estimates a fixation state of the subject based on the information about the first light and the second light.

* * * * *